United States Patent
Kim et al.

(10) Patent No.: US 8,703,340 B2
(45) Date of Patent: Apr. 22, 2014

(54) LITHIUM SECONDARY BATTERY WITH IMPROVED ENERGY DENSITY

(75) Inventors: Hong Jeong Kim, Daejeon (KR); Cha Hun Ku, Daejeon (KR); Soo Ryoung Kim, Daejeon (KR); Hong Kyu Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/201,385

(22) PCT Filed: Feb. 16, 2010

(86) PCT No.: PCT/KR2010/000946
§ 371 (c)(1),
(2), (4) Date: Oct. 17, 2011

(87) PCT Pub. No.: WO2010/093219
PCT Pub. Date: Aug. 19, 2010

(65) Prior Publication Data
US 2012/0028134 A1 Feb. 2, 2012

(30) Foreign Application Priority Data

Feb. 13, 2009 (KR) .......................... 10-2009-0011697
Feb. 16, 2010 (KR) .......................... 10-2010-0013759

(51) Int. Cl.
*H01M 4/88* (2006.01)
*H01M 4/13* (2010.01)
*H01M 4/58* (2010.01)

(52) U.S. Cl.
USPC ................ 429/231.95; 429/218.1; 429/231.9; 252/182.1

(58) Field of Classification Search
None
See application file for complete search history.

(56) References Cited

U.S. PATENT DOCUMENTS

| 6,436,577 B1 | 8/2002 | Kida et al. |
| 2004/0201948 A1 | 10/2004 | Hosoya et al. |
| 2008/0241660 A1 | 10/2008 | Ogawa et al. |
| 2009/0104530 A1* | 4/2009 | Shizuka et al. ............... 429/223 |

FOREIGN PATENT DOCUMENTS

| JP | 2004-281253 | * 10/2004 | .............. H01M 4/58 |
| JP | 2007-128723 A | 5/2007 | |
| JP | 2007-188703 A | 7/2007 | |
| KR | 10-2007-0109854 A | 11/2007 | |
| KR | 10-2010-0005416 A | 1/2010 | |
| WO | WO 2007/116971 | * 10/2007 | .............. H01M 4/52 |
| WO | WO 2007/129848 | * 11/2007 | .............. H01M 4/58 |
| WO | WO 2007/129860 A1 | 11/2007 | |

OTHER PUBLICATIONS

English translation of JP 2004-281253.*
International Search Report issued in PCT/KR2010/000946 dated Oct. 4, 2010.
Xingjiang Liu, et al. A mixture of LiNi1/3Co1/3Mn1/3O2 and LiCoO2 as positive active material of LIB for power application. Journal of Power Sources, 174 (2007) 1126-1130.

* cited by examiner

*Primary Examiner* — Yoshitoshi Takeuchi
(74) *Attorney, Agent, or Firm* — Birch, Stewart, Kolasch & Birch, LLP

(57) ABSTRACT

Provided is a lithium secondary battery with enhanced energy density including a cathode using a cathode active material containing lithium mixed transition metal oxide absorbing and discharging lithium ions, wherein a final discharge voltage is in the range of about 1.5 V to about 2.75 V. A final discharge voltage can be reduced to 1.5 V to 2.75 V from 3.0 V by using various lithium mixed transition metal oxides as a cathode active material, or by using the various lithium mixed transition metal oxides with the LCO-based cathode material mixed. Compared to typical LCO-based cathode materials of which capacity and energy density do not change even if a final discharge voltage is decreased, a cathode material of the present invention results in further improving capacity by 10-20% as the final discharge voltage is decreased.

2 Claims, 1 Drawing Sheet

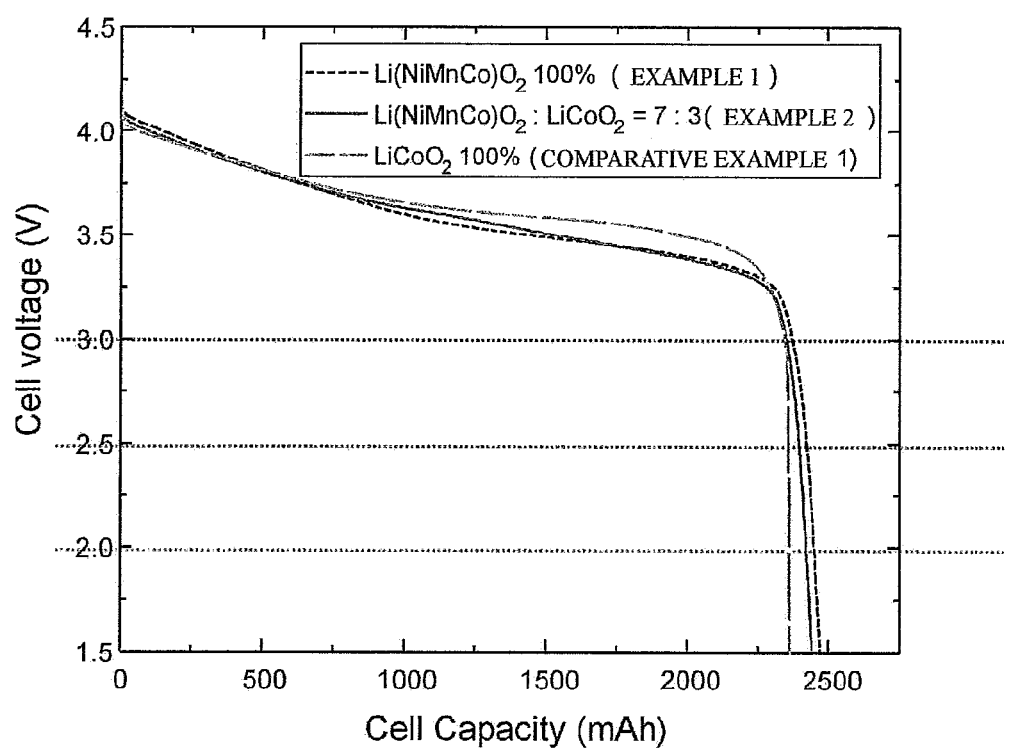

LITHIUM SECONDARY BATTERY WITH IMPROVED ENERGY DENSITY

CROSS-REFERENCE TO RELATED APPLICATIONS

This patent application claims the benefit of Korean Patent Application No. 10-2009-0011697, filed on Feb. 13, 2009 and Korean Patent Application No. 10-2010-0013759, filed on Feb. 16, 2010, which are hereby incorporated by reference in its entirety into this application.

BACKGROUND OF THE INVENTION

The present invention disclosed herein relates to a lithium secondary battery having enhanced energy density, and more particularly to a lithium secondary battery of which energy density and capacity are improved by reducing a final discharge voltage using various lithium mixed transition metal oxides as a cathode active material, or using the lithium mixed transition metal oxide with a lithium cobalt oxide (LCO)-based cathode material mixed.

In line with technology development and increasing demand for mobile devices, demands for a secondary battery as an energy source are sharply increased. Of various secondary batteries, many studies have been conducted on lithium secondary batteries with high energy density and discharge voltage, and lithium secondary batteries are commercialized and widely used.

Typically, unlike non-rechargeable primary batteries, secondary batteries which can be charged and discharged are actively studied with the development of state-of-the-art technologies such as digital cameras, cellular phones, notebook computers, and hybrid cars. Examples of secondary batteries may include nickel-cadmium batteries, nickel-metal hydride batteries, nickel-hydrogen batteries, lithium secondary batteries, and the like.

In general, performances required for secondary batteries may include high energy density, high output density, low self-discharge rate, high energy efficiency, and long cycle life. Therefore, among the plurality of secondary batteries, lithium secondary batteries have been known as a high-energy density battery because lithium secondary batteries have several advantages such as wide range of operating temperature, stable discharge voltage, and low self-discharge rate.

Also, since lithium secondary batteries have an operating voltage of 3.6 V or higher, they are used as a power supply for mobile electronic devices, or used for high power hybrid cars in a state that several lithium secondary batteries are connected in series. Lithium secondary batteries have an operating voltage three times higher than those of nickel-cadmium batteries or nickel-metal hydride batteries, and excellent energy density per unit weight, and therefore tend to be popularly used. Furthermore, with the development of mobile communication and information electronics industries, demands for lightweight lithium secondary batteries with high capacity continue to increase.

Therefore, researches on anode and cathode materials have been conducted to develop secondary batteries having the above-described performances. Of these anode and cathode materials, a cathode active material which is expressed as $LiCoO_2$ has been representatively studied.

Most of currently used cathode active materials are a lithium cobalt oxide (hereinafter, referred to as 'LCO-based cathode material'), and FIG. 1 is a graph showing a discharging profile of an LCO-based cathode material. It can be observed that a slope is very sharp at the end of discharge of the cathode material, which shows that a slight difference in capacity leads to a great difference in voltage.

It can be understood that a final discharge voltage of the LCO-based cathode material is 3.0 V; however, even if the final discharge voltage gets lower than 3.0 V, there is no change in capacity and energy density in the LCO-based cathode material. Moreover, the LCO-based cathode material has a limitation of small discharge capacity.

Technologies of partially replacing Co with another transition metal in $LiCoO_2$ have also been studied. However, such an active material also has low energy density and poor cyclic properties, and thus those technologies are insufficient to obtain lithium secondary batteries having high energy density required in a market of secondary batteries. Therefore, it is required to develop a cathode material enabling capacity and energy density to be improved.

SUMMARY OF THE INVENTION

The present invention is hereby derived to solve the above-described limitations of low energy density and capacity in typical secondary batteries using an LCO-based cathode material.

The present inventors have solved the above-described limitations by substituting all of LCO-based cathodes which were typically used as a cathode active material, with various lithium mixed transition metal oxides, or by using the lithium mixed transition metal with the LCO-based cathode material mixed.

Accordingly, the present invention provides a lithium secondary battery capable of improving battery capacity and energy density by lowering a final discharge voltage.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawing:

FIG. 1 is a graph showing discharging profiles of Examples 1 and 2, and Comparative Example 1.

DETAILED DESCRIPTION OF PREFERRED EMBODIMENTS

A lithium secondary battery of the present invention for achieving the above-described object is characterized in that a cathode uses a cathode active material including a lithium-mixed transition metal oxide absorbing and discharging lithium ions, and a final discharge voltage is in the range of about 1.5 V to about 2.75 V.

The present invention will be more fully described below.

The present invention provides a lithium secondary battery with enhanced battery capacity and energy density because a final discharge voltage may be decreased by singly using a variety of lithium mixed transition metal oxides as a cathode active material, or by using the lithium mixed transition metal oxides with typical LCO-based cathode materials mixed.

FIG. 1 shows discharging profiles according to cathode active materials in a preferred embodiment of the present invention. From FIG. 1, it can be seen that a cathode active material of the present invention, which uses a lithium-mixed transition metal oxide or a mixture of the lithium-mixed transition metal oxide and the LCO-based cathode active material, has a lower final discharge voltage than typical LCO-based cathode active material.

The cathode active material according to the present invention capable of reducing a final discharge voltage includes a lithium-mixed transition metal oxide absorbing and discharging lithium ions, and a lithium secondary battery manufactured from a cathode using the cathode active material has a final discharge voltage in the range of about 1.5 V to about 2.75 V.

The lithium-mixed transition metal oxide constituting the cathode active material according to the present invention includes $Li_xNi_{1-y-z}Mn_yCo_zO_2$, where $0.9 \leq x \leq 1.3$, $0<y<1$, and $0<z<1$.

The lithium-mixed transition metal oxide constituting the cathode active material according to the present invention includes $Li_xNi_{1-y-z}Mn_yCo_zM_sO_{2-t}$, where $0.9 \leq x \leq 1.3$, $0.2 \leq y \leq 0.5$, $0.1 \leq z \leq 0.4$, $0 \leq s \leq 0.3$, $-2 \leq t \leq 2$, and M is one of Mg, Ti, Ca, B and Al.

Also, the lithium-mixed transition metal oxide constituting the cathode active material according to the present invention includes $Li_x(Co_yA_mD_z)O_t$, where $0.8 \leq x \leq 1.2$, $(0.8-m-z) \leq y \leq (2.2-m-z)$, $0 \leq m \leq 0.3$, $0 \leq z \leq 0.3$, $1.8 \leq t \leq 4.2$, said A is selected from Mg and Ca, and said D is at least one selected from the group consisting of Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

Also, the lithium-mixed transition metal oxide constituting the cathode active material according to the present invention includes $Li_x(Co_yA_mD_z)O_t$, where $0.8 \leq x \leq 1.2$, $(0.8-m-z) \leq y \leq (2.2-m-z)$, $0<m \leq 0.3$, $0 \leq z \leq 0.3$, $1.8 \leq t \leq 4.2$, said A is selected from Mg and Ca, and said D is at least one selected from the group consisting of Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

Also, the lithium-mixed transition metal oxide constituting the cathode active material according to the present invention includes α-NaFeO$_2$ with a layered crystal structure. Herein, the transition metal includes a transition metal mixture of Ni, Mn and Co, an average oxidation number of all transition metals except for lithium is greater than +3, the lithium-mixed transition metal oxide satisfies following Equations:

$$1.1 < m(Ni)/m(Mn) < 1.5 \quad (1)$$

$$0.4 < m(Ni^{2+})/m(Mn^{4+}) < 1 \quad (2)$$

where, m(Ni)/m(Mn) denotes a molar ratio of Ni to Mn, and m(Ni$^{2+}$)/m(Mn$^{4+}$) denotes a molar ratio of Ni$^{2+}$ to Mn$^{4+}$.

Further, the lithium-mixed transition metal oxide constituting the cathode active material according to the present invention includes at least one compound represented by following Eq. 3

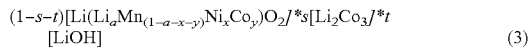

where, $0<a<0.3$, $0<x<0.8$, $0<y<0.6$, $0<s<0.05$, and $0<t<0.05$.

The lithium-mixed transition metal oxide constituting the cathode active material according to the present invention includes a lithium-containing transition metal oxide and $Li_xNi_{1-y-z}Mn_yCo_zO_2$, where $0.9 \leq x \leq 1.3$, $0<y<1$, and $0<z<1$.

The lithium-mixed transition metal oxide constituting the cathode active material according to the present invention includes LiCoO$_2$ and a composition represented by following Eq. 4, where lithium ions are absorbed and discharged between mixed transition metal oxide layers ('MO layers'), Ni ions derived from the MO layer are inserted to a lithium ion absorbing and discharging layer ('reversible lithium layer') and mutually bonded to the MO layers, and a molar ratio of Ni ions inserted and bonded to the reversible lithium layer can be about 0.03 to about 0.07 based on total amount of Ni.

$$Li_xM_yO_2 \quad (4)$$

where, $M=M'_{1-k}A_k$, where, M' is $Ni_{1-a-b}(Ni_{1/2}Mn_{1/2})_aCo_b$ $(0.65 \leq a+b \leq 0.85$ and $0.1 \leq b \leq 0.4)$; A is dopant; $0 \leq k < 0.05$; and $x+y \approx 2$ $(0.95 \leq x \leq 1.05)$.

In the lithium mixed transition metal oxide according to the present invention, Ni$^{2+}$ and Ni$^{3+}$ coexist in the MO layer and a portion of Ni$^{2+}$ is inserted into a reversible lithium layer. That is, since Ni ions are partially inserted into the reversible lithium layer, the lithium mixed transition metal oxide according to the present invention retains a well growing layered structure without the collapse of a crystal structure while keeping an oxidation number of the Ni ion inserted into the reversible lithium layer even though lithium is discharged during charging procedure. Therefore, batteries including the lithium mixed transition metal oxide as a cathode active material can have high capacity and high cyclic stability.

A composition of the lithium mixed transition metal oxide may be represented by following Equations, and should satisfy specific conditions defined by Eq. 4.

$$Ni_{1-(a+b)}(Ni_{1/2}Mn_{1/2})_aCo_b \text{ and } 0.65 \leq a+b \leq 0.85 \quad (i)$$

$$0.1 \leq b \leq 0.4 \quad (ii)$$

$$x+y \approx 2 \text{ and } 0.95 \leq x \leq 1.05 \quad (iii)$$

In relation to the condition (i), $Ni_{1-(a+b)}$ means Ni$^{3+}$ content. If a molar ratio of Ni$^{3+}$ exceeds about 0.35 (if $a+b<0.65$), the lithium mixed transition metal oxide cannot be manufactured on a mass production scale in the air using Li$_2$CO$_3$ as a raw material but should be manufactured in an oxygen atmosphere using LiOH as a raw material. Accordingly, production efficiency is decreased to lead to an increase in manufacturing cost. On the contrary, if Ni$^{3+}$ content is less than about 0.15 (if $a+b>0.85$), there is no competitiveness in terms of capacity per volume of LiNiMO$_2$ compared to LiCoO$_2$.

When considering the conditions (i) and (ii), Ni including Ni$^{2+}$ and Ni$^{3+}$ may be excessively contained in LiNiMO$_2$ according to the present invention in comparison with Mn and Co, i.e., total molar ratio of Ni including Ni$^{2+}$ and Ni$^{3+}$ is in the range of about 0.4 to about 0.7. However, the present invention is not limited thereto. In the case where Ni content is too small, it is difficult to achieve high capacity; however, in the case where Ni content is too large, stability may be sharply decreased. Resultingly, the lithium mixed transition metal oxide is higher in volume capacity and lower in raw material cost than lithium-cobalt based oxides.

Also, if a molar fraction of Ni$^{2+}$ to the Ni content is too high, cation mixing is increased to locally faun a rock salt structure which does not react electrochemically. This disturbs charging and discharging, and also reduces discharge capacity accordingly. On the contrary, if a molar fraction of Ni$^{2+}$ is too low, instability increases to deteriorate cyclic stability. Thus, a molar fraction of Ni$^{2+}$ may be 0.05 to 0.4 based on total content of Ni.

Therefore, the inserted Ni$^{2+}$ is inserted between the MO layers to support the MO layers, and it is thus preferable that Ni$^{2+}$ be contained in an amount enough to stably support between at least MO layers to thereby allow charge stability and cyclic stability to be improved. In addition, rate properties should not be degraded by inserting Ni$^{2+}$ to an extent not preventing lithium ions from being absorbed and discharged in the reversible lithium layer. From overall consideration of these points, a molar fraction of $Ni^{2+}$ inserted and bonded to the reversible lithium layer may be 0.03 to 0.07 based on the total Ni content.

The content of $Ni^{2+}$ or content of inserted $Ni^{2+}$ may be determined by a sintering atmosphere, for example, by controlling lithium content. When oxygen concentration is high in the sintering atmosphere, the content of $Ni^{2+}$ becomes small relatively.

In relation to the condition (ii), a molar ratio (b) of Co is 0.1 to 0.4. If the amount of Co is too excessive, i.e., b>0.4, the excessive amount of Co causes raw material cost to be increased overall and reversible capacity to be slightly decreased. On the contrary, if the amount of Co is too small, i.e., b<0.1, it is difficult to obtain sufficient rate properties and high powder density of batteries at the same time.

In relation to the condition (iii), if Li content is too large, that is, if x>1.05, there is a limitation that stability may be deteriorated during a cycle of high voltage (U=4.35 V) at 60° C. On the contrary, if Li content is too small, that is, if x<0.95, rate properties may be lowered and reversible capacity may be decreased.

Also, the $LiNiMO_2$ may further include a small amount of dopant selectively. The dopant may be, for example, aluminum, titanium, magnesium, or the like, which is incorporated into a crystal structure. Further, other dopants such as B, Ca, Zr, F, P, Bi, Al, Mg, Zn, Sr, Ga, In, Ge, and Sn are not incorporated into a crystal structure, but may be accumulated in a grain boundary or included as a coating on a surface. These dopants should be doped in doping concentrations allowing reversible capacity not to be significantly decreased and stability, capacity and over-charge stability of batteries to be increased. Thus, doping concentrations of these dopants should be less than about 5% (k<0.05), as defined in Eq. 4. Moreover, the doping concentration of the dopants may be less than 1% within a range allowing stability to be increased without a decrease in reversible capacity.

In the case where the above-described lithium mixed transition metal oxide is used as a cathode active material, a final discharge voltage may be decreased to about 2.5 V or less, as illustrated in FIG. 1. It can be confirmed that the capacity of a battery becomes greater than typical LCO-based active materials by about 10% as the final discharge voltage is decreased.

Also, a cathode active material according to the present invention may be comprised of only a lithium mixed transition metal oxide having the predetermined composition and a configuration of a specific atomic group, or may be comprised of other lithium-containing transition metal oxides as well as the lithium mixed transition metal oxide according to circumstances.

Examples of the lithium-containing transition metal oxide may include: a layered compound such as lithium cobalt oxide ($LiCoO_2$) and lithium nickel oxide ($LiNiO_2$) or a compound substituted with at least one transition metal; lithium manganese oxide such as a compound having a chemical formula of $Li_{1+x}Mn_{2-y}O_4$ (where, x ranges from 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; nickel-site type lithium nickel oxide represented by a chemical formula of $LiNi_{1-y}M_yO_2$ (where, M=Co, Mn, Al, Cu, Fe, Mg, B, or Ga, and x=0.01 to 0.3); lithium manganese complex oxide represented by a chemical formula of $LiMn_{2-y}M_yO_2$ (where, M=Co, Ni, Fe, Cr, Zn, or Ta, and y=0.01 to 0.1) or $Li_2Mn_3MO_8$ (where, M=Fe, Co, Ni, Cu, or Zn); $LiMn_2O_4$ with a part of lithium being substituted with an alkaline earth metal ion; disulfide compound; and a complex oxide formed of $Fe_2(MoO_4)_3$. However, examples of the lithium-containing transition metal oxide are not limited to the above.

The surface of the above-listed lithium transition metal mixed oxide may be coated with $Al_2O_3$ or the like for enhancing performance. Of course, the lithium transition metal mixed oxide may be mixed with $Al_2O_3$ or the like.

The other lithium-containing transition metal oxides may be included in an amount of 80% or less by weight together with the lithium transition metal mixed oxide. Even in case of mixing the other lithium-containing transition metal oxide with the lithium transition metal mixed oxide, it can be confirmed that the final discharge voltage is decreased and battery capacity/energy density are increased, as illustrated in FIG. 1.

Also, in the case where the lithium-mixed transition metal oxide constituting the cathode active material according to the present invention includes $Li_x(Co_yA_mD_z)O_t$, the lithium-mixed transition metal oxide includes $\alpha$-$NaFeO_2$ with a layered crystal structure. Herein, the transition metal includes a transition metal mixture of Ni, Mn and Co, an average oxidation number of all transition metals except for lithium is greater than +3, the lithium-mixed transition metal oxide satisfies following Equations:

$$1.1 < m(Ni)/m(Mn) < 1.5 \quad (1)$$

$$0.4 < m(Ni^{2+})/m(Mn^{4+}) < 1 \quad (2)$$

where, $m(Ni)/m(Mn)$ denotes a molar ratio of Ni to Mn, and $m(Ni^{2+})/m(Mn^{4+})$ denotes a molar ratio of $Ni^{2+}$ to $Mn^{4+}$.

Further, in the case where the lithium-mixed transition metal oxide constituting the cathode active material according to the present invention includes $Li_x(Co_yA_mD_z)O_t$, the lithium-mixed transition metal oxide may include at least one compound represented by following Eq. 3.

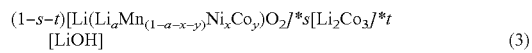

where, 0<a<0.3, 0<x<0.8, 0<y<0.6, 0<s<0.05, and 0<t<0.05.

Further, in the case where the lithium-mixed transition metal oxide constituting the cathode active material according to the present invention includes $Li_x(Co_yA_mD_z)O_t$, the lithium-mixed transition metal oxide may include a compound represented by following Eq. 4.

where, M=M'$_{1-k}$A$_k$, where, M' is $Ni_{1-a-b}(Ni_{1/2}Mn_{1/2})_aCo_b$ (0.65≤a+b≤0.85 and 0.1≤b≤0.4); A is dopant; 0≤k<0.05; and x+y≈2 (0.95≤x≤1.05).

Therefore, in case of forming various cathode active materials like the present invention, the final discharge voltage of the cathode may be decreased to about 1.5 to about 2.75 V, thereby increasing energy density. However, it is undesirable to unlimitedly lower the final discharge voltage to 0 V because the lowering of the final discharge voltage may cause an aluminum foil used as a cathode current collector to be corroded, or may lead to a burden of over-discharge.

The cathode may be prepared by coating a cathode current collector with the mixture of the above-described cathode active material, conductive material and binder, and then drying the resultant mixture. According to a circumstance, a filler may be further filled into the mixture.

The cathode current collector is generally manufactured with a thickness of about 3 to about 500 μm. The cathode current collector is not particularly limited as long as it has high conductivity without causing chemical changes of a battery, and may include, for example, stainless steel, aluminum, nickel, titanium, sintered carbon, or aluminum or stainless steel surface-surface treated with carbon, nickel, titanium, silver, etc. The current collector may have an increased adhesive strength of a cathode active material by forming fine convex-concave portions on the surface thereof, and may be formed into various shapes such as film, sheet, foil, net, porous body, foam body, non-woven fabric body, etc.

The conductive material is typically added in an amount of about 0.1 to about 50% by weight based on the total weight of a mixture including the cathode active material. The conductive material is not particularly limited as long as it has high conductivity without causing chemical change of a battery, and for example, the conductive material may include: graphite such as natural graphite or artificial graphite; carbon black such as carbon black, acetylene black, ketchen black, channel black, furnace black, lamp black, summer black, etc.; a conductive fiber such as carbon derivatives including carbon fiber, metal fiber, etc.; metal powder such as carbon fluoride, aluminum, nickel powder, etc.; a conductive whisker such as zinc oxide, potassium titanate, etc.; conductive metal oxide such as titanium oxide, etc.; a conductive material such as polyphenylene derivative, etc.

The binder is a component which supports adhesion between an active material and a conductive material or the like, and adhesion between an active material and a current collector, and is typically added in an amount of about 1 to about 50% by weight based on the total weight of a mixture including a cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone; tetrafluoroethylene; polyethylene; polypropylene; ethylene-propylene-diene terpolymer (EPDM), sulfonated EPDM, styrene-butylene rubber; fluorine rubber; a variety of copolymers, and the like.

The filler is a component to inhibit expansion of a cathode and selectively used, and is not particularly limited as long as it is made of fibrous materials without causing chemical change of a battery. For example, olefin based polymer such as polyethylene, polypropylene, etc.; a fibrous material such as glass fiber, carbon fiber, etc is used.

The anode is manufactured by applying an anode active material on an anode current collector and drying it, and may further include components as described in the cathode, if necessary.

The anode current collector is generally manufactured with a thickness of about 3 to about 500 μm. The anode current collector is not particularly limited as long as it has conductivity without causing chemical change of a battery, and copper, stainless steel, aluminum, nickel, titanium, sintered carbon, copper or stainless steel surface-treated with carbon, nickel, titanium, silver, etc., aluminum-cadmium alloy, etc., may be used. In addition, similarly to the cathode current collector, the adhesive strength of an anode active material may be increased by forming fine convex-concave portions on the surface of the current collector, and various forms such as film, sheet, foil, net, porous body, foam body, non-woven fabric body, etc. may be used.

The anode active material may include, for example, carbon such as hard carbon, graphite-based carbon, etc.; a metal complex oxide such as $Li_yFe_2O_3$ ($0 \leq y \leq 1$), $Li_yWO_2$ ($0 \leq y \leq 1$), $Sn_xMe_{1-x}Me'_yO_z$ (Me: Mn, Fe, Pb, and Ge; Me': Al, B, P, Si, the elements in the groups I, II and III of the periodic table, and halogen; $0 \leq x \leq 1$; $1 \leq y \leq 3$; and $1 \leq z \leq 8$); a lithium metal; a lithium alloy; a silicon based alloy; a tin based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene, etc.; and a Li—Co—Ni based material, and the materials may be used alone or in combination thereof.

A separator used in the present invention is included between the cathode and the anode, is an insulating thin film having high ion permeation and mechanical strength, and has a pore diameter of about 0.01 to about 10 μm and a thickness of about 5 to about 300 μm. Preferred examples of a separator material may include polyethylene, polypropylene, polytetrafluoroethylene, polyethylene terephthalate, polybutylene terephthalate, polyethylene naphthalate, and a mixture of two or more thereof, but they are not limited thereto.

In addition, one or both sides of the separator may be coated with an inorganic material.

In addition, the present invention provides a cathode, an anode, a separator of the present invention interposed between the cathode and anode, and a lithium secondary battery including a non-aqueous electrolyte containing a lithium salt.

The electrolyte is a non-aqueous electrolyte containing a lithium salt, and consists of a non-aqueous electrolyte and a lithium salt. The non-aqueous electrolyte includes a non-aqueous electrolyte solution, a solid electrolyte, an inorganic solid electrolyte, etc.

As the non-aqueous electrolyte solution, at least one of an aprotic solvent including, for example, N-methyl-2-pyrrolidinone, propylene carbonate, ethylene carbonate, butylene carbonate, dimethyl carbonate, diethyl carbonate, ethylmethyl carbonate, γ-butyrolactone, 1,2-dimethoxyethane, tetrahydroxy franc, 2-methyl tetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc. may be used.

A mixed solvent of a cyclic carbonate-based solvent and a linear carbonate-based solvent may be used.

In addition, ethylene carbonate or ethylene or a mixed solvent of a linear carbonate such as ethylene carbonate and ethylmethyl carbonate may be used.

For example, at least one of polyethylene derivatives, polyethylene oxide ethylene derivatives, polypropylene oxide derivatives, a phosphoric ester polymer, polyagitation lysine, polyester sulfide, polyvinyl alcohol, polyvinylidene fluoride, and a polymer including an ionic dissociation group, etc. may be used as the organic solid electrolyte.

As the inorganic solid electrolyte, at least one of a nitride of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc., a halogen, a sulfate, etc. may be used.

The lithium salt is a material readily soluble in the non-aqueous electrolyte, and for example, at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium 4-phenyl borate, imides, etc may be used.

In addition, in order to enhance charge/discharge characteristics, flame resistance, etc., for example, pyridine, triethylphosphite, triethanolamine, cyclic ether, ethylenediamine, n-glyme, hexaphosphoric acid triamide, nitrobenzene derivatives, sulfur, quinone imine dyes, N-substituted oxazolidinone, N,N-substituted imidazolidinine, ethyleneglycol dialkylether, ammonium salts, pyrrole, 2-methoxy ethanol, tri-chloro aluminum, etc. may be added to the non-aqueous electrolyte. Moreover, in order to make the electrolyte flame retardant, a halogen based solvent such as carbon tetrachloride, ethylene trifluoride, etc. may be further included. In order to enhance the high temperature conservative properties, carbonate dioxide gas may be further added.

A lithium secondary battery may be a cylindrical battery including a circular jelly-roll to the level cross-section and a square-shaped battery including a square-shaped jelly-roll. A circular jelly-roll that may be applied to the cylindrical battery is circularly wound to manufacture a battery, as described above.

Accordingly, a secondary battery according to the present invention may be used to a small battery such as digital camera, cellular phone, and laptop computer.

In addition, when a plurality of the secondary batteries are connected to each other to manufacture a medium-to-large battery, the present invention may be used for various purposes requiring high power, and includes, for example, a power tool driven by an electric motor; an electric vehicle including an electric vehicle (EV), a hybrid electric vehicle (HEV), and a plug-in hybrid electric vehicle (PHEV); an electric two-wheel vehicle including an E-bike and an E-scooter; an electric golf cart, etc., but it is not limited thereto.

Hereinafter, the present invention will be described in more detail with reference to Examples. However, the following Examples are provided only for illustrative purposes and are not intended to limit the scope of the present invention.

Example 1

1-1. Manufacture of Cathode

A ternary active material ($Li(Ni_aMn_bCo_c)O_2$, $a=0.5$, $b=0.3$, $c=0.2$) was used alone as a cathode active material, and 1.5% by weight of Super-P (conductive material) and 2.5% by weight of PVdF (coupling agent) were added to N-methyl-2-pyrrolidone (NMP) which was a solvent to prepare a cathode mixture slurry, and it was coated, dried, and pressurized on a long-sheet type aluminum foil to manufacture a cathode sheet.

1-2. Manufacture of Anode

Artificial graphite was used as an anode active material, 95% by weight of artificial graphite, 1% by weight of Denka Black (conductive material), and 4% by weight of PVdF (coupling agent) were added to NMP which was a solvent to prepare an anode mixture slurry, and it was coated, dried, and pressurized on a long-sheet type aluminum foil to manufacture an anode sheet.

1-3. Manufacture of Battery

The anode sheet manufactured above, a separator (PE), and the cathode sheet were sequentially stacked, then circularly wound to place the cathode sheet in the anode sheet and mounted in a cylindrical battery case, and a carbonate-based electrolyte of 1 M $LiPF_6$ was impregnated in the battery case to manufacture a cylindrical battery, in which a CID was mounted on its top portion.

Example 2

A battery was manufactured in the same manner as in Example 1, except that a ternary active material ($Li(Ni_aMn_bCo_c)O_2$, $a=0.5$, $b=0.3$, $c=0.2$) as a cathode active material and an LCO-based active material (general $LiCoO_2$) were mixed at a weight ratio of 70 to 30.

Comparative Example 1

A battery was manufactured in the same manner as in Example 1, except that an LCO-based active material (general $LiCoO_2$) was used as a cathode active material.

Experimental Example

The discharge profile and capacity/energy for each voltage of each battery manufactured in Examples and Comparative Example were measured and the results are shown in the following Tables 1 and 2 and FIG. 1.

TABLE 1

| | | Example 1 | | Example 2 | | Comparative Example 1 | |
|---|---|---|---|---|---|---|---|
| Battery composition | | Capacity (mAh) | Relative capacity (%) (Comparative Example = 100%) | Capacity (mAh) | Relative capacity (%) (Comparative Example = 100%) | Capacity (mAh) | Relative capacity (%) |
| Final discharge voltage | 3.0 V | 2369 | 101.0 | 2351 | 100.2 | 2346 | 100.0 |
| | 2.5 V | 2421 | 102.8 | 2394 | 101.7 | 2354 | 100.0 |
| | 2.0 V | 2450 | 104.0 | 2410 | 102.3 | 2356 | 100.0 |
| | 1.5 V | 2472 | 104.8 | 2449 | 103.9 | 2358 | 100.0 |

TABLE 2

| | | Example 1 | | Example 2 | | Comparative Example 1 | |
|---|---|---|---|---|---|---|---|
| Battery composition | | Energy (Wh) | Relative energy (%) (Comparative Example = 100%) | Energy (Wh) | Relative energy (%) (Comparative Example = 100%) | Energy (Wh) | Relative energy (%) |
| Final discharge | 3.0 V | 8.55 | 99.7 | 8.49 | 99.0 | 8.58 | 100.0 |
| | 2.5 V | 8.69 | 101.0 | 8.61 | 100.1 | 8.6 | 100.0 |

TABLE 2-continued

|  | | Example 1 | | Example 2 | | Comparative Example 1 | |
| --- | --- | --- | --- | --- | --- | --- | --- |
|  | | | Relative energy | | Relative energy | | |
| Battery composition | | Energy (Wh) | (%) (Comparative Example = 100%) | Energy (Wh) | (%) (Comparative Example = 100%) | Energy (Wh) | Relative energy (%) |
| voltage | 2.0 V | 8.75 | 101.6 | 8.67 | 100.7 | 8.61 | 100.0 |
|  | 1.5 V | 8.79 | 102.1 | 8.7 | 101.0 | 8.61 | 100.0 |

From the results in Tables 1 and 2, it was confirmed that batteries in Examples 1 and 2 according to the present invention substituted all the LCO-based cathode materials which were cathode active materials with various lithium mixed transition metal oxides or used a mixture with the LCO-based cathode material, and maintained high levels of capacities or energy densities. This may be due to a fact that a cathode active material according to the present invention effectively reduced the final discharge voltage of a battery.

In addition, as observed in the discharge profile graph of FIG. 1, the voltage drop of the battery in Comparative Example at the end of discharge was so great that there was almost no change in capacity or energy density even though the final discharge voltage was lowered. However, in the present invention, it was found out that the capacity and energy density were down-regulated to increase the voltage and energy density.

According to the present invention, a final discharge voltage can be reduced to 1.5 V to 2.75 V from 3.0 V by substituting a LCO-based cathode material with various lithium mixed transition metal oxides, or by using the various lithium mixed transition metal oxides with the LCO-based cathode material mixed. Compared to typical LCO-based cathode materials of which capacity and energy density do not change even if a final discharge voltage is decreased, a cathode material of the present invention results in additional improvement of capacity by 10-20% as the final discharge voltage is decreased.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A lithium secondary battery comprising:
   a cathode using a cathode active material including a lithium mixed transition metal oxide absorbing and discharging lithium ions,
   wherein the lithium mixed transition metal oxide comprises:

$Li_x(Co_yA_mD_z)O_t$, where $0.8 \leq x \leq 1.2$, $(0.8-m-z) \leq y \leq (2.2-m-z)$, $0 < m \leq 0.3$, $1.8 \leq t \leq 4.2$,
   said A is selected from Mg and Ca, and
   said D is at least one selected from the group consisting of Ti, Zr, Hf; V, Nb, Ta; Cr, Mo, W; Mn, Tc, Re; Fe, Ru, Os, Co, Rh, It, Ni, Pd, Pt; Cu, Au, Ag; Zn, Cd, Hg; B, Al, Ga, In, TI; C, Si, Ge, Sn, Pb; N, P, As, Sb and Bi and
   and wherein the lithium mixed transition metal oxide further comprises
   α-NaFeO$_2$ composition having a layered crystal structure,
   where the transition metal includes a transition metal mixture of Ni, Mn and Co, an average oxidation number of all transition metals except for lithium is greater than +3, and the lithium mixed transition metal oxide satisfies following Equations 1 and 2

$1.1 < m(Ni)/m(Mn) < 1.5$ (Eq. 1)

$0.4 < m(Ni^{2+})/m(Mn^{4+}) < 1$ (Eq. 2)

wherein $m(Ni)/m(Mn)$ denotes a molar ratio of Ni to Mn, and
   $m(Ni^{2+})/m(Mn^{4+})$ denotes a molar ratio of $Ni^{2+}$ to $Mn^{4+}$; and
   wherein the secondary battery final discharge voltage is in the range of about 1.5 V to about 2.75 V.

2. The lithium secondary battery of claim 1, wherein the lithium mixed transition metal oxide further comprises at least one or more than two compounds represented by following Eq. 3, $(1-s-t)[Li(Li_aMn_{(1-a-x-y)}Ni_xCo_y)O_2]*s[Li_2CO_3]*t[LiOH]$ (3)

where, $0 < a < 0.3$, $0 < x < 0.8$, $0 < y < 0.6$, $0 < s < 0.05$, and $0 < t < 0.05$.

* * * * *